United States Patent
Chen et al.

(10) Patent No.: US 10,218,786 B2
(45) Date of Patent: Feb. 26, 2019

(54) WEB CONTENT COMMUNICATION

(71) Applicant: Nokia Technologies Oy, Espoo (FI)

(72) Inventors: Ziyan Chen, Beijing (CN); Shouyan Chen, Beijing (CN); Maokun Han, Beijing (CN); Chaobin Guo, Beijing (CN)

(73) Assignee: NOKIA CORPORATION, Sunnyvale, CA (US)

( * ) Notice: Subject to any disclaimer, the term of this patent is extended or adjusted under 35 U.S.C. 154(b) by 370 days.

(21) Appl. No.: 14/653,615

(22) PCT Filed: Jan. 16, 2013

(86) PCT No.: PCT/CN2013/070546
§ 371 (c)(1),
(2) Date: Jun. 18, 2015

(87) PCT Pub. No.: WO2014/110736
PCT Pub. Date: Jul. 24, 2014

(65) Prior Publication Data
US 2015/0304415 A1    Oct. 22, 2015

(51) Int. Cl.
*G06F 15/16*   (2006.01)
*H04L 29/08*   (2006.01)
*H04L 29/06*   (2006.01)

(52) U.S. Cl.
CPC .......... *H04L 67/1095* (2013.01); *H04L 67/02* (2013.01); *H04L 67/32* (2013.01);
(Continued)

(58) Field of Classification Search
USPC ....... 709/223, 224, 203, 206, 217, 219, 220, 709/226, 228, 230, 232; 370/230, 390,
(Continued)

(56) References Cited

U.S. PATENT DOCUMENTS 6,182,125 B1 *  1/2001  Borella ............ G06F 17/30905
                                                709/224
6,442,603 B1 *  8/2002  Borella ............ G06F 17/30905
                                                709/223
(Continued)

FOREIGN PATENT DOCUMENTS

CN          101039214 A       9/2007
CN          101471800 A       7/2009
WO          2011/153475 A1    12/2011

OTHER PUBLICATIONS

"Licklider Transmission Protocol", Wikipedia, Retrieved on Oct. 11, 2016, Webpage available at : https://en.wikipedia.org/wiki/Licklider_Transmission_Protocol.
(Continued)

*Primary Examiner* — Quang N Nguyen
(74) *Attorney, Agent, or Firm* — Mintz Levin Cohn Ferris Glovsky and Popeo, P.C.

(57) ABSTRACT

Embodiments of the present invention relate to web content communication. In accordance with embodiments of the present invention, content items contained in the requested web content may be dynamically analyzed and classified according to their requirement for individual users. Web content items with different requirements are transmitted to the users based on protocols having different transportation characteristics. Those important content items are transmitted based on a more accurate, reliable protocol, thereby ensuring the quality of transmission. Those unimportant content items are transmitted based on a protocol with less or without guarantee of transmission accuracy. In this way, response delays can be reduced. Moreover, even if part or all of the unimportant content items are lost or delayed, the user experience can be maintained on an acceptable level.

33 Claims, 4 Drawing Sheets

(52) U.S. Cl.
CPC .............. *H04L 69/08* (2013.01); *H04L 69/16* (2013.01); *H04L 69/18* (2013.01)

(58) Field of Classification Search
USPC ................................ 370/509; 1/1; 455/414.1
See application file for complete search history.

(56) References Cited

U.S. PATENT DOCUMENTS

| | | | |
|---|---|---|---|
| 6,519,646 | B1 | 2/2003 | Gupta et al. |
| 7,016,898 | B1 | 3/2006 | Forlenza et al. |
| 7,555,016 | B2 * | 6/2009 | Page ..................... H04L 7/0008 370/509 |
| 7,826,831 | B2 * | 11/2010 | Bettis ..................... H04L 47/10 455/414.1 |
| 8,375,277 | B2 * | 2/2013 | Koster ................ H04L 12/1868 370/390 |
| 8,560,718 | B2 * | 10/2013 | Davenport, Jr. ..... H04H 20/103 709/203 |
| 8,725,849 | B1 * | 5/2014 | Lloyd ............... G06F 17/30902 709/220 |
| 8,767,536 | B2 * | 7/2014 | Himayat ............. H04W 28/065 370/230 |
| 9,009,218 | B2 * | 4/2015 | Chen ................ G06F 17/30905 709/203 |
| 9,183,537 | B2 * | 11/2015 | Yambal .................. G06Q 10/10 |
| 9,268,871 | B2 * | 2/2016 | Rezaiifar ................ H04L 67/02 |
| 9,310,881 | B2 * | 4/2016 | Hansen ................. G06F 3/0487 |
| 9,575,998 | B2 * | 2/2017 | Shapiro ............. G06F 17/30274 |
| 9,660,950 | B2 * | 5/2017 | Archibong .............. H04L 51/32 |
| 9,668,298 | B1 * | 5/2017 | Pearl .................... H04W 88/005 |
| 9,712,580 | B2 * | 7/2017 | Watson ............... H04L 65/4069 |
| 9,736,260 | B2 * | 8/2017 | Wheeldon ........... H04L 67/2814 |
| 9,749,376 | B2 * | 8/2017 | Bologh .................. H04L 65/60 |
| 2002/0046284 | A1 | 4/2002 | Brabson et al. |
| 2002/0112096 | A1 | 8/2002 | Kaminsky et al. |
| 2003/0145101 | A1 | 7/2003 | Mitchell et al. |
| 2007/0094723 | A1 | 4/2007 | Short et al. |

OTHER PUBLICATIONS

"Communication Networks/TCP and UDP Protocols", Wikibooks, Retrieved on Oct. 11, 2016, Webpage available at : https://en.wikibooks.org/wiki/Communication_Networks/TCP_and_UDP_Protocols.

"When is it Appropriate to use UDP Instead of TCP?", Stackoverflow, Retrieved on Oct. 4, 2016, Webpage available at : http://stackoverflow.com/questions/1099672/when-is-it-appropriate-to-use-udp-instead-of-tcp.

Extended European Search Report received for corresponding European Patent Application No. 13872059.4, dated Aug. 16, 2016, 12 pages.

Bujlow et al., "Classification of HTTP traffic based on C5.0 Machine Learning Algorithm", IEEE Symposium on Computers and Communications, Jul. 1-4, 2012, pp. 882-887.

"Classifying Network Traffic Using NBAR", Cisco, Apr. 4, 2006, pp. 1-26.

Guo et al., "Research on Web QoS Control Strategy Based on User Behaviour", The Ninth International Conference on Web-Age Information Management, Jul. 20-22, 2008, pp. 564-568.

Huang et al., "Design and Implementation of an Adaptive Web2.0 QoS-based Home Appliance Control Service Platform", Software—Practice and Experience, Jan. 2012, pp. 57 87.

International Search Report and Written Opinion received for corresponding Patent Cooperation Treaty Application No. PCT/CN2013/070546, dated Oct. 24, 2013, 9 pages.

* cited by examiner

WEB CONTENT COMMUNICATION

RELATED APPLICATION

This application was originally filed as Patent Cooperation Treaty Application No. PCT/CN2013/070546 filed Jan. 16, 2013.

FIELD OF THE INVENTION

Embodiments of the present invention generally relate to the field of web technology, and more specifically, to methods and apparatuses for web content communication.

BACKGROUND OF THE INVENTION

With increasing developments of network and web technology, more and more end users are using their client devices or user equipments such as desktop personal computers (PCs), tablet PCs, mobile phones, personal digital assistances (PDAs) and the like to access web content. Traditionally, web content (e.g., data associated with web pages) is communicated from a web server or a cloud server to the user equipment based on transmission control protocol/Internet protocol (TCP/IP). As known, TCP is a connection-oriented protocol which may provide reliable, ordered delivery of a data stream. Currently TCP is the protocol used by major Internet applications such as the World Wide Web. TCP may guarantee that all bytes received will be identical with bytes sent and in the correct order. Since packet transfer is not reliable, a technique known as positive acknowledgment with retransmission is used to guarantee reliability of packet transfers. This fundamental technique of TCP requires the receiver (e.g., the user equipment) to respond with an acknowledgment message as it receives the data packet from the sender (e.g., the web server or cloud server). The sender keeps a record of each packet it sends and a timer from when the packet was sent. The sender will retransmit a packet if the timer expires before the message has been acknowledged.

Connection-oriented protocol like TCP is optimized for accurate transmission. However, it will be appreciated that when network bandwidth and/or processing capacity of the user equipment is relative low, or when some content items of the web content to be transmitted are of large size, the connection-oriented protocol would probably incur relatively long response delays (for example, in the order of seconds) while waiting for out-of-order packets or retransmissions of lost packets. In the meantime, it is found that web content items usually have different degrees of importance. That is, some content might not be very important for individual users in some situations. For example, assume a user is using his/her mobile phone to access a website of a digital book content provider. Usually a web page of such website contains some textual information such as a summary or description of the book's content as well as one or more pictures like illustrations or cover. Although those pictures may convey useful information, they are not essential parts of the web page, especially for the user who is accessing the web page using his/her mobile terminal. Traditionally, a communication based on TCP/IP is likely to take remarkable time cost to guarantee the accurate transmission of those pictures. As a result, the response time is lengthened and the user experience degrades.

In view of the foregoing, there is a need in the art for a solution capable of communicating web content more effectively and efficiently.

SUMMARY OF THE INVENTION

In order to address the foregoing and other potential problems, embodiments of the present invention propose methods and apparatuses for web content communication.

In a first aspect, embodiments of the present invention provide a method for web content communication. The method comprises: classifying, in response to a request for web content of a user, content items contained in the requested web content into a first set and a second set, the first set of content items having different requirement for the user from the second set of content items; transmitting the first set of content items to the user based on a first protocol; and transmitting the second set of content items to the user based on a different second protocol, the first protocol having a different transportation characteristic from the second protocol. Embodiments in this aspect also include corresponding computer program product.

In a second aspect, embodiments of the present invention provide a method for web content communication. The method comprises: sending a request for web content of a user; receiving a first set of content items of the requested web content based on a first protocol; and receiving a second set of content items of the requested web content based on a second protocol, the first set of content items having different requirement for the user from the second set of content items, and the first protocol having a different transportation characteristic from the second protocol. Embodiments in this aspect also include corresponding computer program product.

In a third aspect, embodiments of the present invention provide an apparatus for web content communication. The apparatus comprises: an analyzing unit configured to classify, in response to a request for web content of a user, content items contained in the requested web content into a first set and a second set, the first set of content items having different requirement for the user from the second set of content items; a first transmitting unit configured to transmit the first set of content items to the user based on a first protocol; and a second transmitting unit configured to transmit the second set of content items to the user based on a different second protocol, the first protocol having a different transportation characteristic from the second protocol.

In a fourth aspect, embodiments of the present invention provide an apparatus for web content communication. The apparatus comprises: a requesting unit configured to send a request for web content of a user; a first receiving unit configured to receive a first set of content items of the requested web content based on a first protocol; and a second receiving unit configured to receive a second set of content items of the requested web content based on a second protocol, the first set of content items having different requirement for the user from the second set of content items, and the first protocol having a different transportation characteristic from the second protocol.

These and other optional embodiments of the present invention can be implemented to realize one or more of the following advantages. In accordance with embodiments of the present invention, content items contained in the requested web content may be dynamically analyzed and classified according to their requirement or importance for individual users. Then, web content items with different requirements for the user may be transmitted based on protocols with different transportation characteristics. For example, those important content items are transmitted based on a more accurate, reliable protocol such as TCP, thereby ensuring the quality of transmission. Those unimportant content items are transmitted based on a protocol with less or without guarantee of transmission accuracy such as user datagram protocol (UDP). As such, the number of handshake dialogues and/or acknowledgement transmissions can be reduced and thus the response delays can be shortened. Specifically, even if part or all of the unimportant content items are lost or delayed, the user experience can be maintained on an acceptable level. Moreover, embodiments of the present invention do not deny the opportunity for the user to access the unimportant content items by directly discarding them. Ideally those unimportant content items or at least some of them can be delivered and provided to the user.

BRIEF DESCRIPTION OF THE DRAWINGS

Through reading the following detailed description with reference to the accompanying drawings, the above and other objectives, features and advantages of the embodiments of the present invention will become more comprehensible. In the drawings, several embodiments of the present invention will be illustrated in an exemplary and non-limiting manner, wherein.

Throughout the drawings, same or similar reference numbers indicates same or similar elements.

DETAILED DESCRIPTION OF EMBODIMENTS

Hereinafter, the principle and spirit of the present invention will be described with reference to various exemplary embodiments illustrated in the drawings. It should be appreciated that these embodiments are provided only to enable those skilled in the art to better understand and implement the present invention and should not be constructed as limits of the scope of the invention.

In general, embodiments of the present invention provide methods, apparatuses, and computer program product for web content communication. Upon a request for web content of a user, a cloud server and/or a web server may dynamically analyze the requested web content and classify content items into two sets. For example, the first set comprising important content items for that user, while the second set comprising unimportant content items. Then the content items in the first set are transmitted using a reliable protocol such as TCP, and the content items in the second set are transmitted using a different, real-time protocol with less guarantee of accuracy of transmission, such as UDP. By transmitting different kinds of web content items based on protocols with different transportation characteristics, the response delays may be reduced while maintaining the user experience on an acceptable level even if part or all of the unimportant content items in the second set are lost or delayed.

Figure 1:
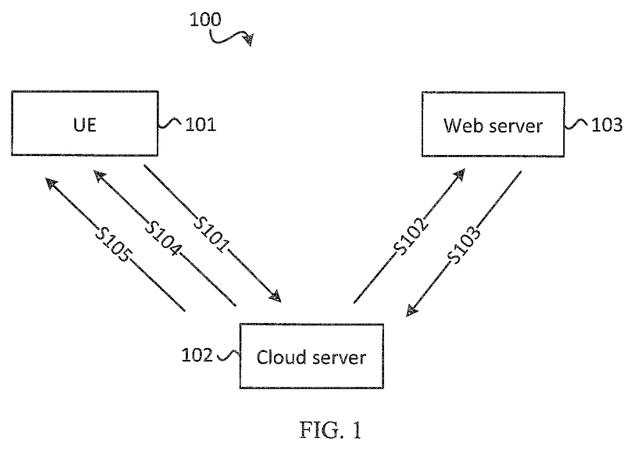
FIG. 1 is a block diagram illustrating a system in accordance with embodiments of the present invention.

Reference is first made to FIG. 1, where a block diagram illustrating a system 100 in which exemplary embodiments of the present invention can be implemented is shown. In accordance with embodiments of the present invention, the system 100 comprises a user equipment (UE) 101. Any suitable device capable of accessing and rendering web content such as web pages may function as the UE 101. For example, various types of user equipment enabling network communication may easily adopt embodiments of the present invention, such as a mobile phone, a portable digital assistant (PDA), a pager, a mobile computer, a mobile TV, a game apparatus, a laptop, a camera, a video camera, a GPS device, or other types of voice and textual communication system. A fixed-type user terminal may likewise easily use embodiments of the present invention. An example of UE 101 will be detailed below with reference to FIG. 6.

In operation, the UE 101 may receive a request for web content from its user. For example, the user may enter the request for web content, such as a uniform resource locator (URL) of a web page, into a web browser or any other web application executing on the UE 101. The user's request may be entered by means of a user interface such as a graphic user interface (GUI), a voice user interface, a tactile user interface and the like of the UE 101. In response, the UE 101 sends the request to a cloud server 102 at S101. The cloud server 102 is a part of the cloud infrastructure, which is capable of receiving and processing user input and storing any data or information associated with end users. Upon receiving the user request from the UE 101, the cloud server 102 may forward, at S102, the request to a web server 103 which contains any hardware and/or software that facilities delivering web content that can be accessed through the network. The web server 103 in turn retrieves and sends the requested web content to the cloud server 102 at S103.

In accordance with embodiments of the present invention, the UE 101, cloud 102 and web server 103 may be connected by, for example, a computer network such as a local area network ("LAN"), a wide area network ("WAN") or the Internet, a communication network, a near field communication connection, or any combination thereof. Specifically, although the system 100 as shown in FIG. 1 is based on the cloud architecture, this should not be taken as a limit of the scope of the present invention. Embodiments of the present invention are applicable in traditional client-server architecture as well. More specifically, in such alternative embodiments, the UE 101 may directly communicate with the web server 103 and the cloud server 102 may be omitted. Accordingly, in these embodiments, all the operations described below with respect to the cloud server 102 may be performed by the web server 103.

Continuing reference to FIG. 1, upon receiving the requested web content from the web server 103, the cloud server 102 may analyze the web content based on a profile associated with the user. The profile at least contains information indicating the requirement of various web content items for the user. As an example, the profile may indicate that some kinds of content items on a web page, such as textual information, especially the text in a proximity to images, scripts, hyperlinks, and/or user-specific information are important; while other content items such as images, cascading style sheets, and/or the head and tail of a web page are unimportant. In accordance with embodiments of the present invention, the profile associated with the user may be maintained at the cloud end, for example, by the cloud server 102 or any another cloud entity. The profile may be stored as a plaintext, database table, Extensive Makeup Language (XML) file, or in any other suitable form.

As used herein, the term "requirement" may refer to the importance of content items for the user in certain situations. Generally speaking, if the user has a higher requirement for a content item, it means that this content item is of higher importance for the user. In accordance with embodiments of the present invention, the requirement of web content items as indicated in the profile may be determined based on the user's preference for content items. In some embodiments, the preference may be explicitly specified by the user. For example, the UE 101 may display to the user a form, check box, text field or any other suitable controls via the user interface to invite the user to define the his/her requirement for different web contents. Alternatively or additionally, the user's preference may be obtained by modeling and learning the user's behavior on the requested web content. Still considering images on web pages as an example, when the images are not downloaded and rendered correctly, if the user always tries to reload the web page, for example, by refreshing the web page or click the menu item "show pictures", it may indicate that the image is important for the user. To the contrary, if the user usually continues his/her browsing or closes the web page in the absence of images, then it is reasonable to deem that the images are of less importance for that user. Any modeling and/or learning algorithms or processes, whether currently known or developed in the future, may be used in connection with embodiments of the present invention to establish the requirement or importance of web content items for the user. Specifically, it will be appreciated that in accordance with embodiments of the present invention, the requirement of web content items may vary with individual users. In other words, the same content item may have different requirements for different users.

Additionally, the user's requirement of web content items may be determined based on one or more characteristics of the UE 101. For example, if a user is using a desktop PC to access web data, images on web pages may be considered as being important. If the user is using a mobile phone or tablet PC having relatively low processing and networking capability, the images may be less important. The characteristics of the UE 101 may include but not limited to one or more of the following: processing capability, storage capacity, screen size, input/output facilities, networking capability, and the like.

Additionally or alternatively, the user's requirement of web content items may be also related to the network condition between the UE 101 and cloud server 102. For example, when the network bandwidth is higher than a predetermined threshold, images on web pages may be considered as being important; while when the network bandwidth is lower than a predetermined threshold, images on web pages may be considered as being unimportant. As another example, there may be an image size threshold associated with the requirement. Accordingly, if the size of an image is below the threshold, then the image is considered as being important. On the other hand, if the size of an image is larger than the size threshold, then the image is considered as being unimportant. In these embodiments, the size threshold may be changed according to the network condition. For example, the size threshold may be increased when the network bandwidth between the UE 101 and cloud server 102 is high, and the threshold may be decreased when the network bandwidth is low.

The requirement of web content items for the user may also depend on types of the requested web content or the target website. More specifically, a certain type of content items may have high requirement for some website but have low requirement for others. For example, the profile may specify that images are important for portal websites and blog websites but unimportant for others such as a bulletin board system (BBS) website or a shopping website. It should be noted that the exemplary embodiments described above are just for the purpose of illustration and should not be taken as limit of the scope of the present invention. Various additional or alternative factors may affect the requirement of web content items for a user, and all of them fall within the scope of the present invention.

Based on the profile associated with the user, the cloud server 102 may classify the requested web content at least into two sets. Only for the ease of description, in the following discussion, the first set will be described as comprising content items with higher requirement for the user, such as textual information, hyperlinks, and/or information regarding the page layout. Accordingly, the second set will be described as comprising content items with lower requirement, such as images on the web page. It should be noted that this is only illustrative. It is possible that the first set contains content items with lower requirement for the user and the second set contains content items with higher requirement. The scope of the present invention is not limited in this regard.

In accordance with embodiments of the present invention, the cloud server 102 will transmit the first and second sets of content items to the UE 101 based on different protocols having different transportation characteristics. Specifically, the cloud sever 102 transmits, at S104, the first set of content items to the UE 101 based on a first protocol. In the embodiments where the first set has higher requirement for the user than the second set, the first protocol may have a high requirement on the accuracy of transmission. That is, the first protocol may guarantee a high transmission quality and a low error rate. In some embodiments, the first protocol may include a connection-oriented protocol such as TCP, for example. Of course, any other suitable protocol such as sequenced packet exchange protocol (SPX) or stream control transmission protocol (SCTP) may also be used as the first protocol. It should be noted that any protocols of network layer, Internet layer, transport layer, and/or application layer that are capable of ensure a high accuracy of transmission, no matter connection-oriented or connectionless, may be used as the first protocol.

The content items in the second set, which are unimportant for the user, are transmitted, at S105, to the UE 101 based on a different second protocol. Compared with the first protocol, the second protocol has a lower requirement on accuracy or reliability. In accordance with embodiments of the present invention, the second protocol may have less or no guarantee of delivery, ordering and/or duplicate protection. For example, the second protocol may have no handshaking dialogues or acknowledgement transmissions and therefore is suitable for transmitting the unimportant web content items where error checking and correction is not necessary. As such, the overhead of such processing at the network interface level is avoided.

In some embodiments, the second protocol may include connectionless protocol, such as UDP with which the content or data may be sent in form of datagrams or packets without prior communications to set up special transmission channels or data paths. It should be noted that any protocols of network layer, internet layer, transport layer, and/or application layer that enable quick data transmission with lower requirement on the accuracy of transmission, no matter connection-oriented or connectionless, may be used as the second protocol.

Transmitting content items with lower requirement or importance based on such second protocol may be advantageous, because dropping some unimportant content items is preferable to waiting for retransmission of lost or delayed packets. Specifically, it will be appreciated that those unimportant content items are transmitted with a less reliable but quicker protocol instead of being directly discarded. In other words, embodiments of the present invention do not deny the opportunity for the user to access the unimportant content items, but just lower the guarantee of the accuracy of transmission. In this way, for example, when the network condition is good, those unimportant content items are likely to be accurately delivered and provided to the user as well. By contrast when the network condition is poor, other important portions of the requested web content may be provided to the user without delay, no matter whether one or more content items in the second set are lost or delayed during transmission. As a result, the user experience can be significantly improved.

In operation, the cloud server 102 may set up two socket ports, for example, a TCP socket port and a UDP socket port. The TCP socket port is used for transmitting the first set of content items while the UDP socket port is used for transmitting the second set of content items. The cloud server 102 may send the first and second sets of content items to the TCP and UDP socket ports, respectively, for transmission to the UE 101. Specifically, it should be noted that although the second set of content items is shown to be transmitted after the first set, this is just for the purpose of illustration and should not be taken as a limit of the present invention. In accordance with embodiments of the present invention, the second set of content items may be transmitted before, after, or in parallel with the first set of content items, and the scope of the present invention is not limited in this regard.

At the client end, the UE 101 may listen for two separate ports for the first and second protocols, respectively, for example, a TCP socket port and a UDP socket port. Upon receiving the first and second sets of the content items from the cloud server 102, the UE 101 combines the content items into the requested web content for rendering to the user. To this end, there should be a mechanism for the UE 101 to determine that the content items in the first and second sets belong to the same web content (e.g., a web page). In some embodiments, the UE 101 may simply deem that the content items received within a predetermined time window belong to the same web content and thus combine those content items.

Alternatively or additionally, when transmitting the first and second sets of content items, the cloud server 102 may associate an identifier of the requested web content with the first and/or second sets of content items. For example, when the requested web content is associated with a web page, the identifier may the URL of the web page. In some embodiments, the identifier of the requested web content may be associated with both of the first and second sets of content items. Alternatively, the identifier may be associated with one only of the first and second sets. For example, as described above, the content items in the first set may be transmitted using TCP. In these embodiments, transmission of the important content items may be performed on a TCP/IP connection on which the request for web content is transmitted from the UE 101 to the cloud server 102. In this event, the UE 101 is able to determine that the first set of content items is associated with the requested web content without any identifier. As such, it is only necessary to associate the identifier with the second set of content items.

In accordance with embodiments of the present invention, the identifier may be associated with the content items in any suitable manner. For example, the cloud server 102 may insert the identifier of the requested web content into a predetermined position of each packet or datagram containing the content items in the second set. Accordingly, the UE 101 may extract the identifier, for example, by retrieving the identifier from the predetermined position of the data packets and combine the first and second sets of content items at least partially based on the identifier of the requested web content. A specific example in this regard will be further detailed below.

Optionally, the requirement of web content items for the user may be updated dynamically. In operation, the UE 101 may collect information regarding the user's actions on the requested web content for updating the profile. Such information may comprise user input indicating any change of the requirement of web content items. For example, the user may expressly add, adjust, and/or delete the requirement of any web content items via the user interface. Alternatively, the UE 101 may collect user's behavior on the requested web content. The information regarding the user's actions on the requested web content may be fed back to the cloud server 102 which in turn updates the requirement of content items, which is stored in the profile associated with the user, with the received information. In this regard, in case that the collected information contains express user input, the requirement of relevant content items may be adjusted accordingly. In case that the collected information contains the user's behavior or implicit user input, the cloud server 102 may apply any suitable machine learning algorithms or processes to adjust the requirement.

Some exemplary embodiments have been described above with reference to FIG. 1. Based on the requirement of web content items for the user, embodiments of the present invention may ensure that the web content requested by the user may be provided as quickly as possible while maintaining the user experience. As a specific example, assume that the profile indicates all images are unimportant for the user. When the user utilizes his/her mobile phone to request a web page, the cloud server 102 may retrieve the requested web page from the web server 103 and then analyze the web page, for example, by accessing its source file based on the profile associated with the user. As a result, the content items of the requested web page are classified into two sets based on their requirement for the user.

In this example, all the images on the web page will be picked out and classified into the second set of content items, while the other content items are classified into the first set. Then the cloud server 102 may set up two ports for transmitting the first and second sets of content items by use of a first and second protocols, respectively. For example, the content items in the first set may be transmitted using TCP and the content items in the second set may be transmitted using UDP. Specifically, when sending the unimportant content items using the UDP, the cloud server may insert the URL of the requested web page into a predetermine position of each UDP packet.

At receiver end, the UE 101 may bind to two different socket ports, one on TCP while the other on UDP. For any packets received on the TCP ports, the UE 101 may cache the content items contained in the TCP packets into a corresponding folder and render them to the user. For any UDP packets received on the UDP ports, the UE 101 may first read the associated identifier form the predetermined position to determine which web page the received content items belong to, such that the UE 101 may save these unimportant content items (images in this case) into the corresponding folder. In this way, when an image is to be rendered, the web browser or any other web application may access the corresponding folder to read the image. If the image exists, it can be correctly rendered. If, on the other hand, the image does not exist, for example, due to delay or loss of UDP transmission, rendering of the image will be skipped instead of waiting for its accurate transmission, thereby reducing the response delays. Optionally, the web browser or application may display an alert on the location of the image, for example, reading "the image is not downloaded." Since the image is not very important for the user, the user experience will not be significantly affected in this event.

Figure 2:
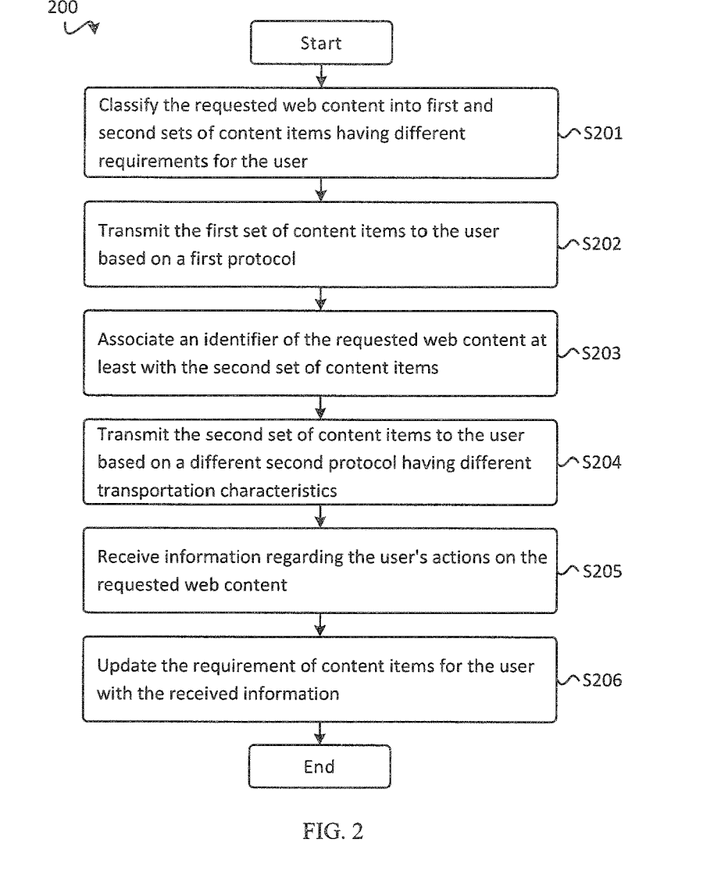
FIG. 2 is a flowchart illustrating a method for web content communication in accordance with an exemplary embodiment of the present invention.

Now referring to FIG. 2, a flowchart illustrating a method 200 for web content communication in accordance with an exemplary embodiment of the present invention is shown. The method 200 may be carried out at the cloud server 102 or web server 103 as shown in FIG. 1.

After the method 200 starts, at step S201, in response to a request for web content of a user, content items contained in the requested web content are classified into a first set and a second set, the first set of content items having different requirement for the user from the second set of content items. In accordance with embodiments of the present invention, the requirement of content items may be determined based on at least one of a preference of the user, a characteristic of a user equipment of the user, a network condition, and a type of the requested web content. For ease of description, assume that the first set of content items has a higher requirement for the user than the second set.

Next, at step S202, the content items in the first set, which are considered to have higher requirement for the user, are transmitted to the user based on a first protocol. In accordance with embodiments of the present invention, the first protocol has a higher requirement on the accuracy of transmission. In some embodiments, the first protocol may be a connection-oriented protocol such as TCP.

The method 200 proceeds to optional step S203, where an identifier of the requested web content is associated at least with the second set of content items. In some embodiments where the requested web content is associated with a web page, the identifier may be a URL of the requested web page. In some embodiments, the identifier may be inserted into the data packet(s) containing the content items in the second set at a predetermined position, such that the UE may retrieve the identifier and combine the second set of content items back into the requested web content.

Then at step 204, the content items in the second set, which are of lower requirement for the user, are transmitted based on a second protocol which is different from the first protocol used for transmitting the first set of content items. The second protocol has different transportation characteristics from the first protocol. Specifically, compared with the first protocol, the second protocol has a lower requirement on the accuracy of transmission. For example, the second protocol may have less or no guarantee of transmission, ordering and/or duplicate protection. In some embodiments, the second protocol may include a connectionless protocol such as UDP.

Optionally, the information regarding actions of the user on the requested web content may be received from the UE 101 at step S205. At step S206, such information may be used to dynamically update the requirement of various web content items for the user. The method 200 ends after step S206.

Figure 3:
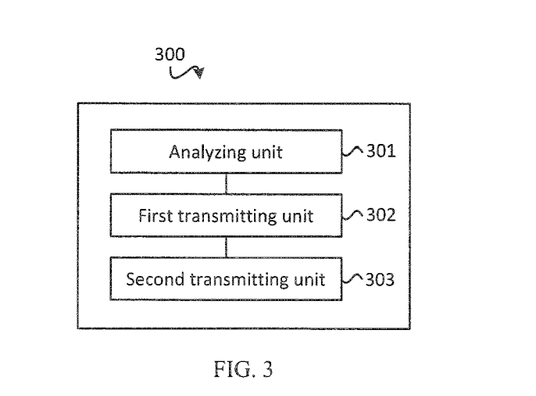
FIG. 3 is a block diagram illustrating an apparatus for web content communication in accordance with an exemplary embodiment of the present invention.

Reference is now made to FIG. 3, where a block diagram illustrating an apparatus 300 for web content communication in accordance with an exemplary embodiment of the present invention is shown. The apparatus 300 may reside at the cloud server 102 or web server 103 as shown in FIG. 1 and perform the method 200 described above with reference to FIG. 2.

As shown, in accordance with embodiments of the present invention, the apparatus 300 comprises an analyzing unit 301 configured to classify, in response to a request for web content from a user, content items contained in the requested web content into a first set and a second set. The first set of content items has different requirement from the second set of content items. The apparatus 300 also comprises a first transmitting unit 302 configured to transmit the first set of content items to the user based on a first protocol, and a second transmitting unit 303 configured to transmit the second set of content items to the user based on a different second protocol. The first has different transportation characteristics from the second protocol.

In some optional embodiments, the apparatus 300 may further comprises an associating unit (not shown) configured to associate an identifier of the requested web content at least with the second set of content items. In some optional embodiments, the associating unit may comprise an inserting unit (not shown) configured to insert the identifier into a predetermined position of a packet containing a content item in the second set. In some optional embodiments, the apparatus 300 may further comprise a receiving unit (not shown) configured to receive information regarding an action of the user on the requested web content, and an updating unit (not shown) configured to update the requirement of web content items for the user with the received information.

In some optional embodiments, the first set of content items may have a higher requirement for the user than the second set. In these embodiments, the first protocol may include a connection-oriented protocol such as TCP, and the second protocol may include a connectionless protocol such UDP.

It will be understood that various units in the apparatus 300 correspond to the steps of method 200 described above with reference to FIG. 2, respectively. As a result, optional units are not shown in FIG. 3 and all the features described with respect to FIG. 2 are also applicable to the apparatus 300, which will not be detailed here.

Figure 4:
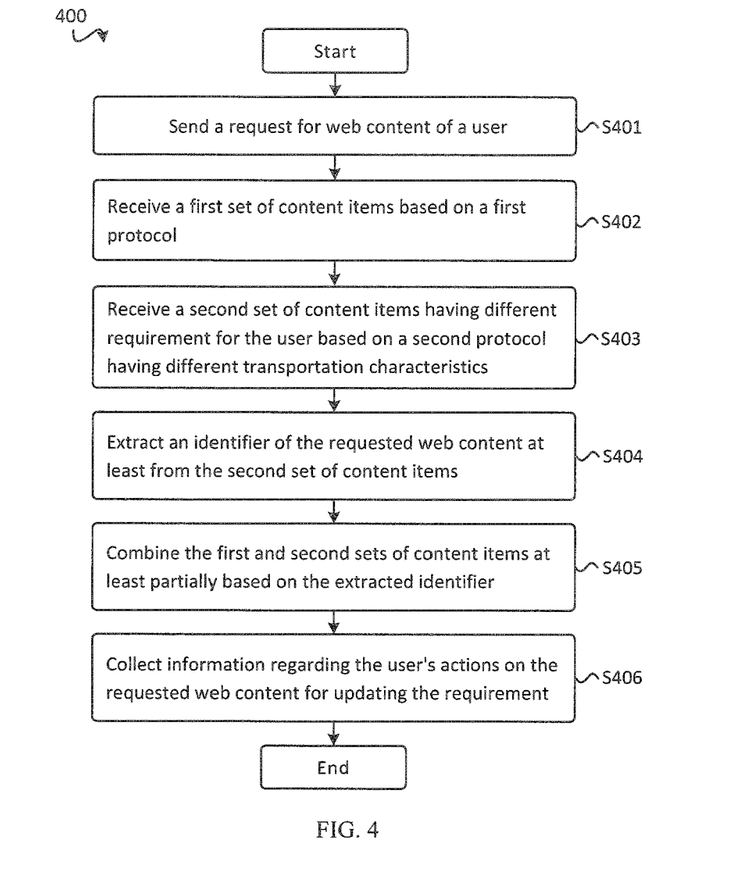
FIG. 4 is a flowchart illustrating a method for web content communication in accordance with an exemplary embodiment of the present invention.

FIG. 4 shows a flowchart illustrating a method 400 for web content communication in accordance with an exemplary embodiment of the present invention. The method 400 may be carried out at the UE 101 as shown in FIG. 1.

As shown, after the method 400 starts, a user's request for web content is sent at step S401. Then at step S402, a first set of content items of the requested web content is received based on a first protocol. Next, a second set of content items of the requested web content is received at step S403 based on a second protocol. As described above, the first and second sets of content items are determined by the cloud server 102 or web server 103 according to their requirement for the user. In accordance with embodiments of the present invention, the requirement of content items may be determined based on at least one of a preference of the user, a characteristic of a user equipment of the user, a network condition, and a type of the requested web content. In accordance with embodiments of the present invention, the first and second protocols have different transportation characteristics. In the embodiments where the first set of content items is of higher requirement than the second set, the first protocol may have a higher requirement on accuracy of transmission than the second protocol. In some embodiments, the first protocol may include a connection-oriented protocol such as TCP, and the second protocol may include a connectionless protocol such as UDP.

In some optional embodiments, an identifier of the requested web content may be extracted, at step S404, at least from the second set of content items. For example, the identifier may be retrieved from a predetermined position of a packet containing content items in the second set. In these embodiments, the first and second sets of content items may be combined at step S405 at least partially based on the extracted identifier. In some optional embodiments, the method 400 may proceed to step S406 where information regarding an action of the user on the requested web content is collected. The collected information may be sent to the cloud server 102 or web server 103 for updating the requirement of web content items for the user. The method 400 ends after step S406.

Figure 5:
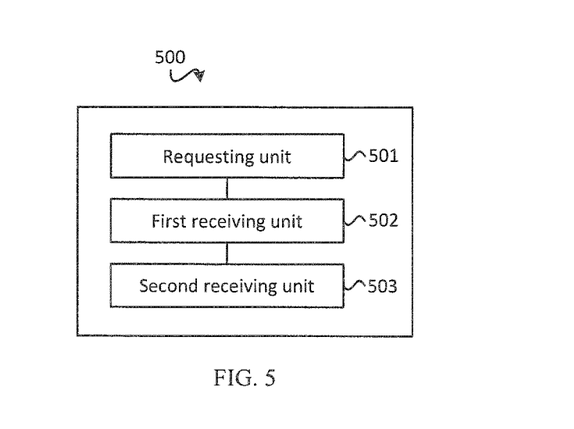
FIG. 5 is a block diagram illustrating an apparatus for web content communication in accordance with an exemplary embodiment of the present invention.

Reference is now made to FIG. 5, where a block diagram illustrating an apparatus 500 for web content communication in accordance with an exemplary embodiment of the present invention is shown. The apparatus 500 may reside at the UE 101 as shown in FIG. 1 and perform the method 400 described above with reference to FIG. 4.

As shown, in accordance with embodiments of the present invention, the apparatus 500 for web content communication comprises: a requesting unit 501 configured to send a request for web content of a user; a first receiving unit 502 configured to receive a first set of content items of the requested web content based on a first protocol; and a second receiving unit 503 configured to receive a second set of content items of the requested web content based on a second protocol. The requirement of the first set of content items for the user is different from the requirement of the second set of content items for the user, and the first protocol has different transportation characteristics from the second protocol. In some embodiments, the requirement of content items may be determined based on at least one of a preference of the user, a characteristic of a user equipment of the user, a network condition, and a type of the requested web content. In the embodiments where the first set of content items has a higher requirement for the user than the second set, the first protocol may include a connection-oriented protocol such as TCP, and the second protocol may include a connectionless protocol such as UDP.

In some optional embodiments, the apparatus 500 further comprises a combining unit (not shown) configured to combine the first and second sets of content items. Specifically, in some embodiments, the apparatus 500 may comprises an extracting unit (not shown) configured to extract an identifier of the requested web content at least from the second set of content items. For example, the extracting unit may comprise a retrieving unit (not shown) configured to retrieve the identifier from a predetermined position of a packet containing a content item in the second set. In these embodiments, the combining unit is configured to combine the first and second sets of content items at least partially based on the extracted identifier. Further, in some optional embodiments, the apparatus 500 may comprise a collecting unit (not shown) configured to collect information regarding an action of the user on the requested web content for dynamically updating the requirement of web content items for the user.

It will be understood that various units in the apparatus 500 correspond to the steps of method 400 described above with reference to FIG. 4, respectively. As a result, optional units are not shown in FIG. 5 and all the features described with respect to FIG. 4 are also applicable to the apparatus 500, which will not be detailed here.

Figure 6:
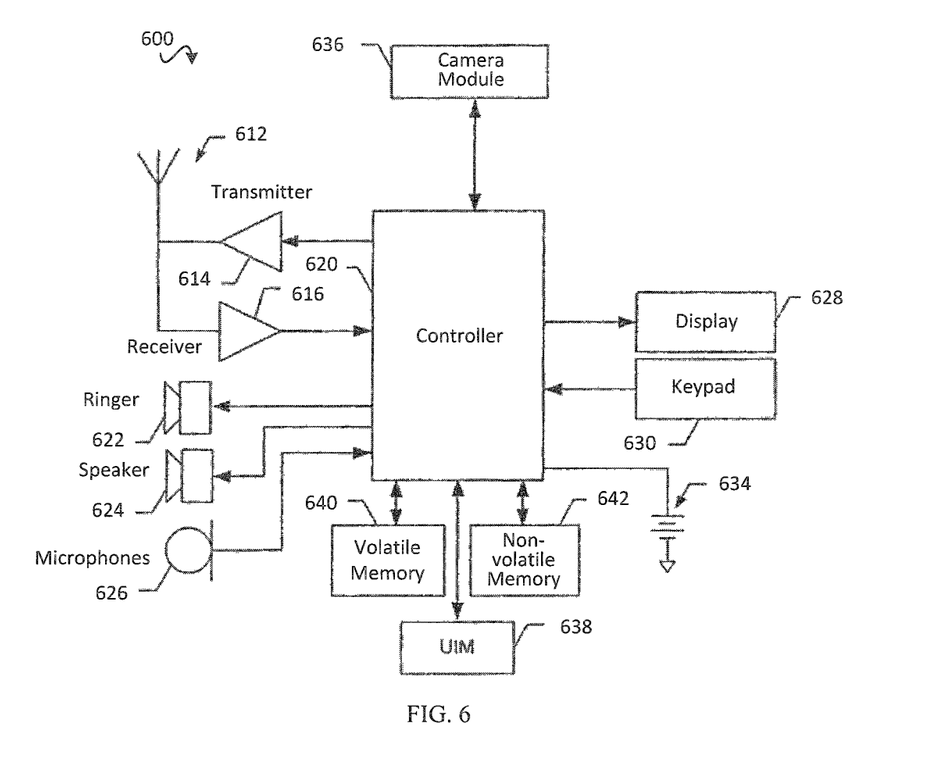
FIG. 6 is a block diagram illustrating a user terminal in which exemplary embodiments of the present invention may be implemented.

FIG. 6 shows a block diagram of a user terminal suitable for implementing the UE 101 as shown and described with reference to FIG. 1. As shown, the user terminal 600 includes an antenna(s) 612 in operable communication with a transmitter 614 and a receiver 616. The user terminal 600 further includes at least one processor or controller 620. It should be understood that the controller 620 includes circuitry required for implementing the function of the user terminal 600. For example, the controller 620 may be comprised of a digital signal processor, a microprocessor, and various analog to digital converters, digital to analog converters, and other support circuits. Control and information processing functions of the user terminal 600 are allocated between these devices in accordance with their respective capabilities.

The user terminal 600 also comprises a user interface, which may include a ringer 622, a speaker 624, a microphone 626, a display 628, and a keypad 630 as a user input device, all of which are coupled to the controller 620. The user terminal 600 may further comprise a camera module 636 for capturing still and/or dynamic images. The user terminal 600 further comprises a battery 634, such as a vibrating battery pack for powering various circuits that are required to operate the user terminal 600, as well as optionally providing mechanical vibration as a detectable output. The user terminal 600 may further include a universal identity module (UIM) 638. The UIM 638 is typically a memory device having a processor built in. The UIM 638 may include, for example, a subscriber identity module (SIM), a universal integrated circuit card (UICC), a universal subscriber identity module (USIM), a removable user identity module (R-UIM), etc. The UIM 638 may comprise a card connection detecting apparatus in accordance with the embodiments of the present invention.

The user terminal 600 further comprises a memory. For example, the user terminal 600 may include volatile memory 640, such as volatile Random Access Memory (RAM) including a cache area for the temporary storage of data. The user terminal 600 may also include other non-volatile memory 642, which can be embedded and/or may be removable. The non-volatile memory 642 can additionally or alternatively comprise an EEPROM, flash memory or the like. The memories can store any of a number of pieces of information, program, and data, used by the user terminal 600 to implement the functions of the user terminal 600.

It should be understood that the structural block diagram in FIG. 6 is shown only for illustration purpose, and is not intended to limit the scope of the present invention. In some cases, some devices may be added or reduced as required.

For the purpose of illustrating spirit and principle of the present invention, some specific embodiments thereof have been described above. In accordance with embodiments of the present invention, content items contained in the requested web content may be dynamically analyzed and classified according to their requirement for individual users. Those important content items are transmitted based on a more accurate, reliable protocol such as TCP, thereby ensuring the quality of transmission. In the meantime, those unimportant content items are transmitted based on a protocol such as UDP with less or without guarantee of transmission accuracy. As such, due to reduction of the number of handshake dialogues or acknowledgement transmissions, the response delay can be reduced. In addition, even if part or all of the unimportant content items are lost or delayed, the user experience will not be significantly affected since other portions of the requested web content will be provided timely.

In general, the various exemplary embodiments may be implemented in hardware or special purpose circuits, software, logic or any combination thereof. Some aspects may be implemented in hardware, while other aspects may be implemented in firmware or software which may be executed by a controller, microprocessor or other computing device. While various aspects of the exemplary embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, the method 200 and 400 as described above may be implemented by computer program. In this regard, the present invention may be embodied as a computer program product comprising a computer program tangibly embodied on a machine readable medium, the computer program containing program codes configured to carry out the method 200 or 400.

Moreover, the apparatus 300 and 500 described above may be implemented as hardware, software/firmware, or any combination thereof. In some embodiments, one or more units in the apparatus 300 and 500 may be implemented as software modules. Alternatively or additionally, some or all of the units may be implemented using hardware modules like integrated circuits (ICs), application specific integrated circuits (ASICs), system-on-chip (SOCs), field programmable gate arrays (FPGAs), and the like. The scope of the present invention is not limited in that regard. Additionally, various blocks shown in FIGS. 3 and 5 may be viewed as method steps, and/or as operations that result from operation of computer program code, and/or as a plurality of coupled logic circuit elements constructed to carry out the associated function(s). For example, the method 300 and 500 may be implemented by computer program codes contained in a computer program tangibly embodied on a machine readable medium.

In the context of the present invention, a machine readable medium may be any tangible medium that can contain, or store a program for use by or in connection with an instruction execution system, apparatus, or device. The machine readable medium may be a machine readable signal medium or a machine readable storage medium. A machine readable storage medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

It should be noted that although a plurality of modules or sub-modules of the system have been mentioned in the above detailed depiction, such partitioning is merely non-compulsory. In actuality, in accordance with the embodiments of the present invention, the features and functions of the above described two or more modules may be embodied in one means. In turn, the features and functions of the above described one means may be further embodied in more modules. Besides, although operations of the present methods are described in a particular order in the drawings, it does not require or imply that these operations must be performed in accordance with this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step, or a step may be divided into a plurality of steps for execution.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the drawings.

Therefore, it will be appreciated that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method comprising:
classifying, by a server and in response to a request for web content from a user equipment, content items for the requested web content according to their importance and into at least two sets comprising a first set of content items and a second set of content items, the first set of content items having a first importance level for the user equipment that is different from a second importance level for the second set of content items, wherein the first importance level and the second importance level are indicated in a profile of the user equipment maintained by a cloud entity;
transmitting, by the server and based on a first protocol, the first set of content items to the user equipment; and
transmitting, by the server and based on a second protocol, the second set of content items to the user equipment, the second set of content items associated with an identifier to enable the user equipment to combine the first set of content items with the second set of content items, the first protocol having a different transportation characteristic from the second protocol.

2. The method according to claim 1, wherein the first protocol is in accordance with a transport control protocol, and wherein the second protocol is in accordance with a user datagram protocol.

3. The method according to claim 1, wherein the first protocol is associated with a higher quality of service when compared to a quality of service associated with the second protocol.

4. The method according to claim 1, wherein the transmitting the second set of content items comprises:
inserting the identifier into a predetermined position of a packet containing a content item in the second set.

5. The method according to claim 1, further comprising:
updating, by the server and in response to user feedback information received from the user equipment, the first importance level and/or the second importance level, the user feedback information associated with the first set of content items and/or the second set of content items.

6. The method according to any of claim 1, wherein the first set of content items is determined based on a network condition and/or a type of the requested web content.

7. The method according to claim 1, wherein the first protocol is a connection-oriented protocol, and wherein the second protocol is a connectionless protocol, wherein the transmitting of the first set of content items and the transmitting of the second set of content items is in parallel.

8. The method according to claim 1, wherein the first protocol and the second protocol are transport protocols.

9. The method according to claim 1, wherein the cloud entity comprises the server.

10. A method comprising:
sending, by a user equipment and to a server, a request for web content of a user;
receiving, at the user equipment and from the server, a first set of content items of the requested web content based on a first protocol;
receiving, at the user equipment and from the server, a second set of content items of the requested web content based on a second protocol, the server interfacing with the user equipment and a web server providing the content items, the second set of content items associated with an identifier, the first set of content items having a first importance level for the user equipment that is different from a second importance level for the second set of content items, wherein the first importance level and the second importance level are indicated in a profile of the user equipment maintained by a cloud entity; and
combining, by the user equipment, the first set of content items and the second set of content items at least partially based on the identifier.

11. The method according to claim 10, wherein the first protocol is in accordance with a transport control protocol, and wherein the second protocol is in accordance with a user datagram protocol, the transport control protocol having the different transportation characteristic from the user datagram protocol.

12. The method according to claim 10, wherein the first protocol is associated with a higher quality of service when compared to a quality of service associated with the second protocol.

13. The method according to claim 10, further comprising extracting the identifier by at least:
retrieving the identifier from a predetermined position of a packet containing a content item in the second set.

14. The method according to claim 10, further comprising:
transmitting, by the user equipment to the server, user feedback information associated with the first set of content items and/or the second set of content items to enable the server to update the first importance level and/or the second importance level.

15. The method according to claim 10, wherein the first set of content items is determined based on a network condition and/or a type of the requested web content.

16. The method according to claim 10, wherein the first protocol is a connection-oriented protocol, and wherein the second protocol is a connectionless protocol, wherein the receiving of the first set of content items and the receiving of the second set of content items is in parallel.

17. The method according to claim 10, wherein the first protocol and the second protocol are transport protocols.

18. An apparatus comprising:
at least one processor; and
at least one memory comprising computer program code, the at least one memory and the computer program code configured to, with the at least one processor, cause the apparatus to at least:
classify, in response to a request for web content from a user equipment, content items for the requested web content according to their importance and into at least two sets comprising a first set of content items and a second set of content items, the first set of content items having a first importance level for the user equipment that is different from a second importance level for the second set of content items, wherein the first importance level and the second importance level are indicated in a profile of the user equipment maintained by a cloud entity;
transmit, based on a first protocol, the first set of content items to the user equipment; and
transmit, based on a second protocol, the second set of content items to the user equipment, the second set of content items associated with an identifier to enable the user equipment to combine the first set of content items with the second set of content items, the first protocol having a different transportation characteristic from the second protocol.

19. The apparatus according to claim 18, wherein the first protocol is in accordance with a transport control protocol, and wherein the second protocol is in accordance with a user datagram protocol.

20. The apparatus according to claim 18, wherein the first protocol is associated with a higher quality of service when compared to a quality of service associated with the second protocol.

21. The apparatus according to claim 18, wherein the apparatus is further caused to at least insert the identifier into a predetermined position of a packet containing a content item in the second set.

22. The apparatus according to claim 18, wherein the apparatus is further caused to at least:
update, in response to user feedback information received from the user equipment, the first importance level and/or the second importance level, the user feedback information associated with the first set of content items and/or the second set of content items.

23. The apparatus according to claim 18, wherein the first requirement is determined based on a network condition and/or a type of the requested web content.

24. The apparatus according to claim 18, wherein the first protocol is a connection-oriented protocol, and wherein the second protocol is a connectionless protocol, wherein the apparatus is further caused to at least:
transmit the first set of content items and the second set of content items in parallel.

25. The apparatus according to claim 18, wherein the first protocol and the second protocol.

26. An apparatus comprising:
at least one processor; and
at least one memory comprising computer program code,
the at least one memory and the computer program code configured to, with the at least one processor, cause the apparatus to at least:
send, to a server, a request for web content of a user;
receive, from the server, a first set of content items of the requested web content based on a first protocol;
receive, from the server, a second set of content items of the requested web content based on a second protocol, the server interfacing with the user equipment and a web server providing the content items, the second set of content items associated with an identifier, the first set of content items having a first importance level for the user equipment that is different from a second importance level for the second set of content items, wherein the first importance level and the second importance level are indicated in a profile of the user equipment maintained by a cloud entity; and
combine the first set of content items and the second set of content items at least partially based on the identifier.

27. The apparatus according to claim 26, wherein the first protocol is in accordance with a transport control protocol, and wherein the second protocol is in accordance with a user datagram protocol, the transport control protocol having the different transportation characteristic from the user datagram protocol.

28. The apparatus according to claim 26, wherein the first protocol is associated with a higher quality of service when compared to a quality of service associated with the second protocol.

29. The apparatus according to claim 26, wherein the apparatus is further caused to at least:
retrieve the identifier from a predetermined position of a packet containing a content item in the second set.

30. The apparatus according to claim 26, wherein the apparatus is further caused to at least:
transmit, to the server, user feedback information associated with the first set of content items and/or the second set of content items to enable the server to update the first importance level and/or the second importance level.

31. The apparatus according to claim 26, wherein the first set of content items is determined based on a network condition and/or a type of the requested web content.

32. The apparatus according to claim 26, wherein the first protocol is a connection-oriented protocol, and wherein the second protocol is a connectionless protocol, wherein the apparatus is further caused to at least:
receive the first set of content items and the second set of content items in parallel.

33. The apparatus according to claim 26, wherein the first protocol and the second protocol.

* * * * *